United States Patent
Strugo et al.

(10) Patent No.: US 12,374,138 B2
(45) Date of Patent: Jul. 29, 2025

(54) TEXT DETECTION IN VIDEOS

(71) Applicant: Microsoft Technology Licensing, LLC, Redmond, WA (US)

(72) Inventors: Eliyahu Strugo, Tel Aviv (IL); Yonit Hoffman, Herzeliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 404 days.

(21) Appl. No.: 18/067,136

(22) Filed: Dec. 16, 2022

(65) Prior Publication Data

US 2024/0203146 A1    Jun. 20, 2024

(51) Int. Cl.
*G06V 30/19* (2022.01)

(52) U.S. Cl.
CPC .... *G06V 30/19093* (2022.01); *G06V 2201/09* (2022.01)

(58) Field of Classification Search
CPC .... G06V 20/46; G06V 2201/09; G06V 20/62; G06V 30/19093; G06V 10/25; G06V 10/62; G06V 10/70; G06V 10/761; G06V 10/82; G06V 20/49; G06V 30/19007; G06V 30/10; G06V 30/262
See application file for complete search history.

(56) References Cited

U.S. PATENT DOCUMENTS

| | | |
|---|---|---|
| 9,179,061 B1 | 11/2015 | Kraft et al. |
| 11,195,148 B2 | 12/2021 | Tang et al. |
| 2014/0193075 A1 | 7/2014 | Pavani |
| 2018/0109843 A1 | 4/2018 | Chang et al. |
| 2019/0236396 A1* | 8/2019 | Ronen .......... G06V 30/153 |
| 2023/0042611 A1 | 2/2023 | Horner |
| 2023/0394860 A1* | 12/2023 | Tao .......... G11B 27/102 |

FOREIGN PATENT DOCUMENTS

| | | | |
|---|---|---|---|
| CN | 113052169 A | * | 6/2021 |
| CN | 113392689 A |   | 9/2021 |
| CN | 113704549 A |   | 11/2021 |

(Continued)

OTHER PUBLICATIONS

Hua, et al., "Efficient Video Text Recognition Using Multiple Frame Integration", In Proceedings of International Conference on Image Processing, vol. 2, Sep. 22, 2002, pp. 397-400.

(Continued)

*Primary Examiner* — Sumati Lefkowitz
*Assistant Examiner* — Connor L Hansen

(57) ABSTRACT

Systems and methods for detecting text in videos. To address problems with conventional Optical Character Recognition (OCR) systems, the present disclosure provides detection of text for improved OCR. Aspects of the present disclosure can, therefore, be utilized to detect a textual logo in videos, including when the text of the textual logo is clearly visible and when the text is inferred. Thus, examples capture appearance time of a textual logo from a video view perspective. Aspects use a multi-threshold pipeline for detecting video frames including the textual logo. A textual-visual scoring system is additionally used to leverage visual aspects of text in logos. A shot detection system is used to detect inferred text beyond a detected video frame. One or more verification models can be further applied.

20 Claims, 10 Drawing Sheets

(56) References Cited

FOREIGN PATENT DOCUMENTS

| | | |
|---|---|---|
| CN | 113761235 A | 12/2021 |
| KR | 101304083 B1 | 9/2013 |
| WO | 0225575 A2 | 3/2002 |

OTHER PUBLICATIONS

"Scale-invariant feature transform", Retrieved from: https://web.archive.org/web/20220704145527/https://en.wikipedia.org/wiki/Scale-invariant_feature_transform, Jun. 8, 2022, 20 Pages.

Kim, et al., "CLIP", Retrieved from: https://web.archive.org/web/20220625172953/https://github.com/openai/CLIP, Jun. 25, 2022, 6 Pages.

Radford, et al., "Learning Transferable Visual Models From Natural Language Supervision", In Repository of arXiv:2103.00020v1, Feb. 26, 2021, 48 Pages.

International Search Report and Written Opinion received for PCT Application No. PCT/US2023/036894, mailed on Dec. 20, 2023, 15 pages.

Phan, et al., "Recognition of Video Text Through Temporal Integration", 12th International Conference on Document Analysis and Recognition, pp. 589-593, Aug. 25, 2013.

Yin, et al., "Text Detection, Tracking and Recognition in Video: A Comprehensive Survey", IEEE Transactions on Image Processing, vol. 25, Issue No. 6, Jun. 1, 2016, pp. 2752-2773.

Notice of Allowance mailed on Jul. 9, 2024, in U.S. Appl. No. 17/804,512, 10 pages.

"International Search Report and Written Opinion Issued in PCT Application No. PCT/US22/048121", Mailed Date: Jan. 30, 2023, 10 Pages.

\* cited by examiner

TEXT DETECTION IN VIDEOS

BACKGROUND

In general, Optical Character Recognition (OCR) refers to the detection of text in an image and recognizing the characters that are part of the text. Character recognition may be implemented in different contexts for a variety of image inputs, including streamed and stored video. A user of an OCR system may rely on the system to accurately recognize text included in the video. Oftentimes, text (e.g., letters, numbers, signs, or other characters) included in the video may appear as blurred, slanted, or otherwise difficult to recognize, or may be at least partially obfuscated. In addition, the same or similar text may vary from frame to frame of the video.

Additionally, videos oftentimes include logos that may appear as part of a script or commercial. Logos can include text and/or images. Logos including text are referred to herein as textual logos. One example textual logo includes the text "Microsoft". A user of an OCR system may rely on the system to accurately recognize text included in a textual logo in a video.

It is with respect to these and other considerations that examples have been made. In addition, although relatively specific problems have been discussed, it should be understood that the examples should not be limited to solving the specific problems identified in the background.

SUMMARY

Examples described in this disclosure relate to systems and methods for detecting text in videos. Various examples relate to the use of Optical Character Recognition (OCR) as part of these systems and methods. Examples of the present disclosure provide systems and methods that provide text detection in videos. In some examples, a multistep technique is used that utilizes two distance thresholds and a shot detection technique to detect all frames in a shot that include target text, such as in a textual logo.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

DETAILED DESCRIPTION

Figure 1:
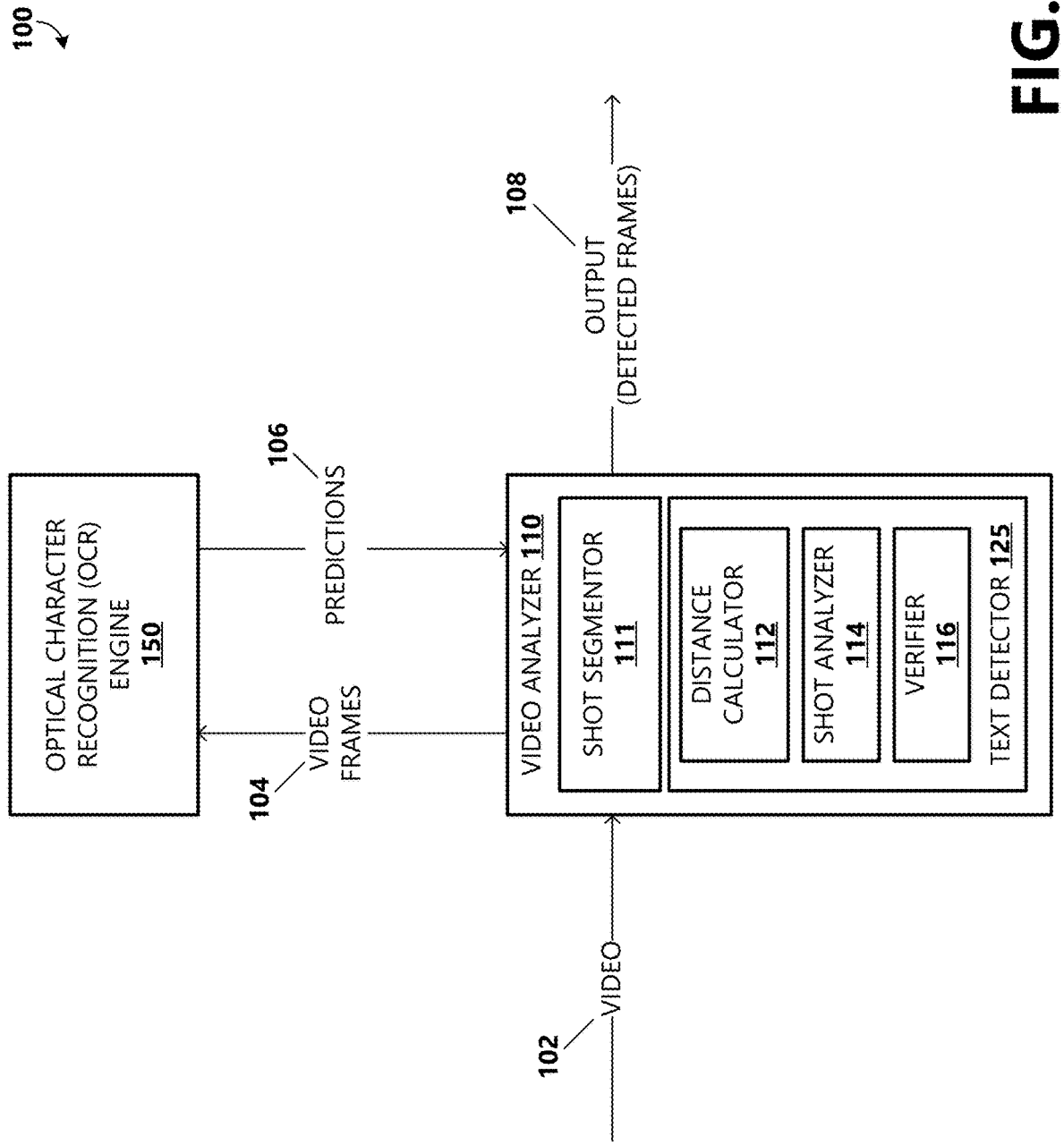
FIG. 1 is a block diagram of a system for detecting text in a video according to an example.

Examples described in this disclosure relate to systems and methods for detecting text in videos. Certain examples relate to the use of OCR as part of these systems and methods. OCR refers to the detection of text in an image and recognizing the characters that are part of the text. OCR may be implemented in different contexts for a variety of inputs (e.g., streamed video or stored video). Inaccurate recognition of text in a video can occur using conventional OCR systems and methods when letters, numbers, signs, or other characters of the text appear as blurred, slanted, or otherwise difficult to recognize, or are at least partially obfuscated. In addition, the same or similar text may vary from frame to frame of the video.

In some examples, text is partially captured by a camera in a frame, and thus the predicted text is only a portion of the entire text. As an example, a sign held by a person in a video may show the text "WE ARE THE FUTURE", but some of the frames may show only the text "HE FUTURE" because the remaining text is blocked by another person or object in the video. In this instance, the text may only be partially detected, and the predictions for such frames may be "HE", "FUTURE", or some other partial text. As can be appreciated, partially detected text can provide inaccurate recognition results.

In examples, where the text is included in a textual logo, inaccurate recognition results may cause the textual logo to be undetected. As an example, a camera held by a person in a video may have a textual logo including the text "CONTOSO", but some of the frames may show only the text "TOSO" of the textual logo because the remaining text is blocked by another person or object in the video. In this instance, the text may only be partially detected, and the textual logo including the text "CONTOSO" may not be detected in those frames of the video. According to examples, a logo is oftentimes used by an enterprise to help a user or customer identify and distinguish the enterprise's goods or services from others in a same or similar field. Upon perceiving a logo, users are typically able to connect the logo to the good or service. For instance, if, after perceiving a textual logo, a portion of the text is obscured, the logo is still inferred by users, while conventional OCR systems and methods may cause the textual logo to be undetected. Insights into when an enterprise's logo (e.g., textual logo) is exposed in a video can be valuable information to the enterprise.

Conventional OCR systems and methods may further provide inaccurate recognition results when text is mispredicted, such as when text appears blurry or because of faulty processing by the OCR system. Moreover, conventional OCR systems and methods may provide an output of similar results that are not analyzed as an aggregate. As an example, two different predicted results may be provided as an output without any aggregation. This approach neglects the connection between frames, and the ability to learn and improve from one frame to the other.

To address such problems with conventional OCR systems, the present disclosure describes systems and methods that provide detection of text for improved OCR. Aspects of the present disclosure can, therefore, be utilized to detect text in videos, including when the text is clearly visible and when the text is inferred. Thus, examples capture appearance time of text from a video viewer perspective. One example of text includes a textual logo. For example, a textual logo can represent text that identifies and distinguishes an item (e.g., product) from another item, such as items in a video.

For instance, the system and method include using a high first threshold for determining a first set of detected frames visually closest to specified target text and extending the detected frames to include less-visually close predictions within the shot. An example less-visually close prediction includes a partial and/or mis-predicted OCR result mentioned above. In some examples, the detected frames are extended by applying a lower second threshold value.

As can be appreciated, when a lower second threshold value is applied, partial and/or mis-predicted OCR results may be incorporated into the results. For instance, when a prediction is visually far from target text due to partial and/or mis-predicted OCR results, a lower confidence prediction can be overridden by the predicted text of a selected representative (e.g., visually close or correct) prediction of the shot. For instance, text of a lower confidence prediction is replaced with text of a higher confidence prediction in the shot. Accordingly, recall of the system is improved, where recall refers to the percentage of the text in the video that is correctly recognized by the system. As such, a higher recall indicates a higher percentage of text in the video correctly recognized by the system. Thus, the combination of using the high threshold for detecting target text and a lower threshold for extending predicted frames improves recall while maintaining precision of the system.

FIG. 1 is a block diagram of a system 100 for providing text detection in videos in accordance with one example. As depicted, the example system 100 includes a video analyzer 110 and an OCR engine 150. In an example, the video analyzer 110 and OCR engine 150 are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. As will be described herein, the video analyzer 110 includes a text detector 125 that operates to execute a number of computer readable instructions, data structures, or program modules to provide text detection in videos 102. In some examples, the text detector 125 further operates to provide textual detection in videos 102. In some examples, and as depicted in FIG. 1, the text detector 125 includes a distance calculator 112, a shot analyzer 114, and a verifier 116. In some examples, one or more of the distance calculator 112, shot analyzer 114, and verifier 116 are combined.

In some examples, the video analyzer 110 is used to process both streamed (e.g., live) video and stored video. In other examples, the video analyzer 110 is used to process streamed or stored video. Video 102 may be received from any image capture device (e.g., camera) capable of generating video frames 104 that can be processed by the video analyzer 110. Streamed video may correspond to video that is created using a video camera compatible with the Real-Time Streaming Protocol (RTSP). As an example, streamed video may be received from cameras, such as closed-circuit television (CCTV) cameras and security cameras. Stored video may be received from any video management system or another type of video storage system. In some examples, the video 102 includes audio.

According to examples, the video analyzer 110 receives videos 102 from one or more video sources and extracts video frames 104 from the received video 102. In some examples, the video analyzer 110 provides the extracted frames to the OCR engine 150. As used herein, the term "frame" refers to any temporal unit associated with the video 102 that is selected based on structural and semantic properties associated with the temporal unit. In one example, a video frame 104 refers to a temporal unit comprising a still image associated with the video 102. As an example, if a video is formatted as a 30 frames per second (fps) video, then it has 30 frames for each second of the video. In one example, the video analyzer 110 extracts one frame per second from the video and transmits the frames to the OCR engine 150. As part of this process, stored video or streamed video may be subjected to transcoding, as needed.

According to an aspect and as further depicted in FIG. 1, the OCR engine 150 processes video frames 104 to generate predictions 106 related to text included in the video frames 104. Character recognition may be implemented in different contexts for a variety of inputs (e.g., streamed or stored video), where the OCR engine 150 analyzes and detects text (e.g., characters and words) in video frames 104. In an example, the OCR engine 150 identifies areas of a video frame 104 that include text (e.g., by placing a rectangle or bounding box around the text) and uses text recognition to predict the text within each such identified area. As used herein, the term "prediction" refers to one or more determinations made by the OCR engine 150 as to what the text in a video frame 104 is recognized to be. For instance, a prediction 106 includes predicted text.

Figure 2:
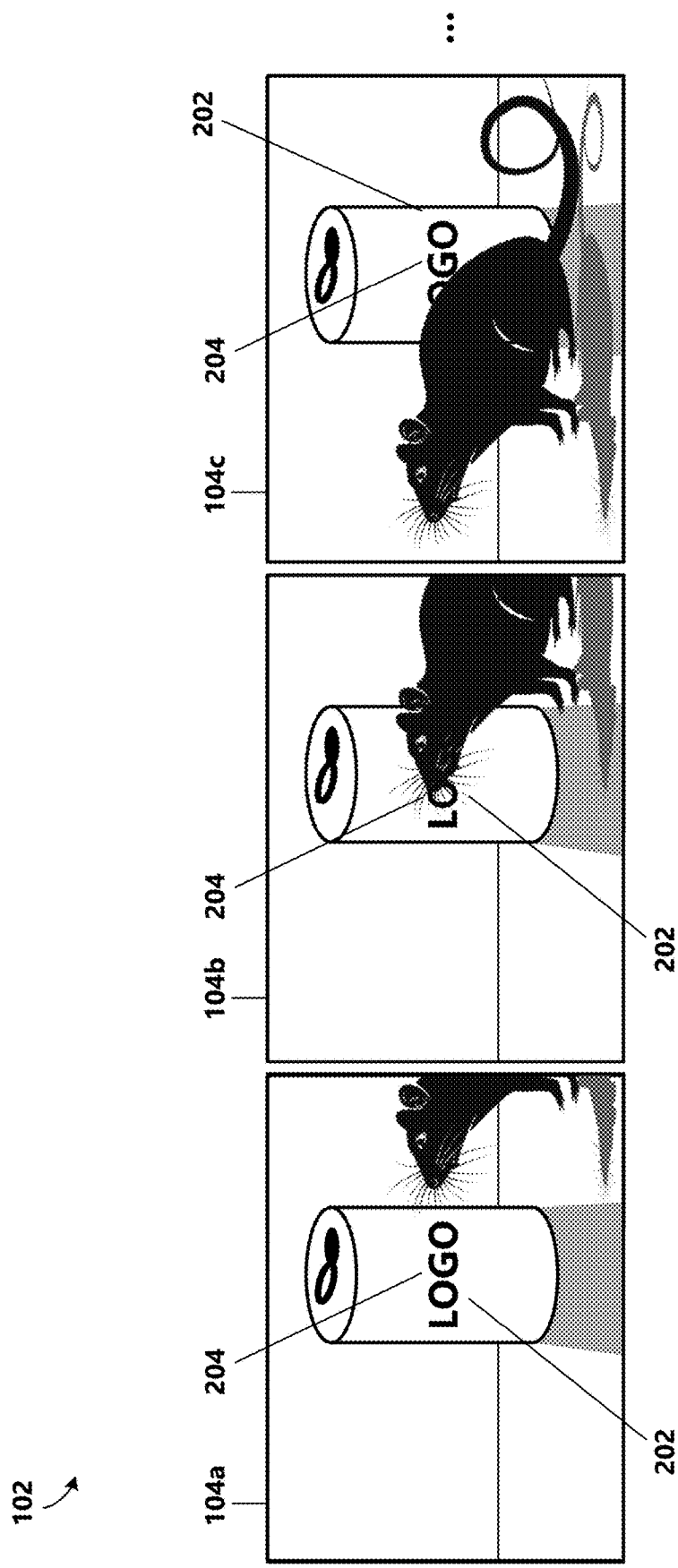
FIG. 2 is an illustration of text in a video according to an example.

Oftentimes, a video frame 104 includes noise (e.g., electronic noise or blurriness) and/or a portion of text may be hidden or otherwise not visible in the video frame 104, which can hinder the OCR process. For example, and as depicted in FIG. 2, a video 102 includes a plurality of video frames 104a-104c, where a first example video frame 104a includes the text 202 "LOGO". For example, the text 202 is included in a textual logo 204 on an example product, which is depicted as a canned drink. For instance, the textual logo 204 identifies and distinguishes the canned drink from other canned drinks. Additionally, the video 102 includes a second example video frame 104b and a third example video frame 104c where a portion of the text 202 "LOGO" in the textual logo 204 is blocked, such as by a person or an object in the image of the video frames 104. For example, the text 202 revealed in the second video frame 104b may include "L O _ _", and the text 202 revealed in the third video frame 104c may include "_ _ G O", where a different portion of the text "LOGO" is blocked. In other instances, false positive text predictions 106 are determined, where false positive predictions include predicted text that is incorrectly identified (e.g., recognized as text other than what the text 202 is or what the text 202 says).

In some examples, a prediction 106 generated by the OCR engine 150 includes the predicted text that the OCR engine 150 has recognized the text 202 in a video frame 104 to be, a timestamp and/or frame number associated with the video frame 104, a bounding box marking an area of the frame image including the recognized text 202, and a confidence score associated with the prediction 106. The confidence score may represent the certainty of prediction for the text 202 in a video frame 104. In some examples, trained artificial intelligence (AI) models are used by the OCR engine 150 to output predictions 106 associated with the text 202 displayed in the video frames 104. The predictions 106 are provided by the OCR engine 150 to the video analyzer 110. Thus, an input to the video analyzer 110 includes predictions 106 over the video frames 104 of video 102. According to some examples, the video analyzer 110 uses a combination of: the predicted text that the OCR engine 150 has recognized the text 202 in the video frame 104 to be, the timestamp (or frame number) associated with the video frame 104, the bounding box information, and the confidence score to evaluate a prediction 106 to determine whether a textual logo 204 is detected. In other examples, less information is used.

According to examples, a contiguous sequence of video frames 104 with a same camera angle is defined as a shot. Different shots differ in the angle, zoom, or camera. A video 102 includes one or more scenes, where each scene is comprised of one or more shots. For example, there may be a scene of two people talking; and each instance where the camera focuses on a different person is considered a different shot. According to examples, the video analyzer 110 includes a shot segmentor 111 that detects shots and their boundaries in the video 102. In some examples, the shot segmentor 111 segments the video 102 into a plurality of shots. The shot segmentor 111 analyzes the video frames 104 of the video 102 and determines sets of video frames 104 that include images taken contiguously by a single camera and represented in a continuous action in time and space. The shot segmentor 111 may use any suitable technique. An example technique includes evaluating consecutive video frames 104 of the video 102 and determining a similarity score representing a similarity or dissimilarity between the two video frames 104. The similarity scores of two video frames 104 are evaluated, and a hard and or soft cut is detected between two video frames 104 when the score meets or exceeds an absolute or relative threshold value representative of detected shot transition (e.g., abrupt or gradual transitions). Accordingly, the shot segmentor 111 determines which sequences of one or more video frames 104 are grouped as a shot. The OCR results (e.g., predictions 106) and shot segmentation results are provided to the text detector 125.

Figure 3:
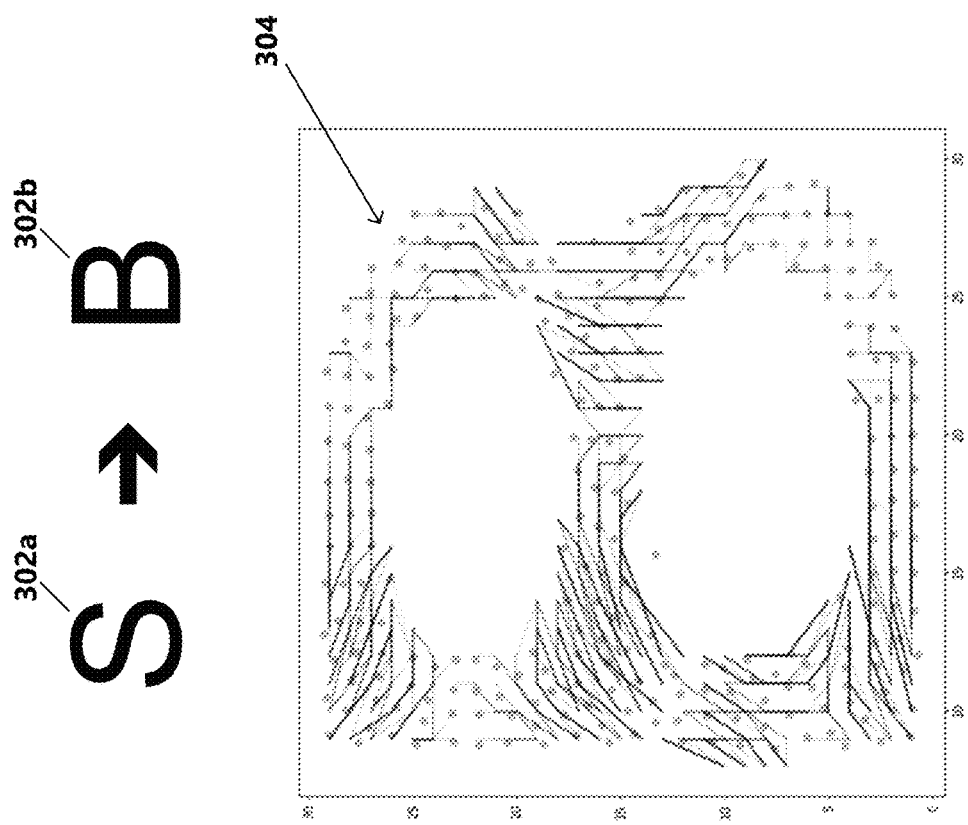
FIG. 3 is an illustration depicting a method of determining a textual-visual score (distance D) of a text prediction.

According to examples, the distance calculator 112 determines a distance metric (D) (e.g., a textual-visual score) between target text 202 and predicted text by using a scoring system that quantifies textual visual similarity between characters. In some examples, the distance metric D is within a range between 0 and 1, where 0 is a minimum distance and 1 is a maximum distance. In other examples, a different scoring scale is used. According to some implementations, the distance calculator 112 visually compares characters (e.g., letters, numbers, symbols) in target text and predicted text to determine a distance to move from one character to another. For instance, and with reference to FIG. 3, characters 302a, 302b (collectively, 302) are represented as binary images comprised of a collection of pixels 304. Probability distributions between the characters 302 of target text 202 and predicted text are compared by moving the pixels 304 of the characters 302 along an optimal path from first positions in a first character 302a to second positions in a second character 302b. The Euclidian distance between the first positions and the second positions of the pixels 304 of each character 302 are calculated and determined as the textual-visual score (distance D) of a prediction 106. Thus, two characters 302 that are visually similar will have a lower distance (D) between them.

According to examples, the distance calculator 112 determines the OCR prediction 106 that is closest to the target text 202 in each video frame 104 (e.g., having a minimum distance metric ($D_{min}$)). For instance, when the video analyzer 110 is used to detect a specific textual logo 204 in a video frame 104, the $D_{min}$ prediction is the closest predicted text to the textual logo 204 in the video frame 104.

The distance calculator 112 further applies a first threshold value $T_1$ to the $D_{min}$ predictions 106 to determine a first set of video frames 104 where the target text 202 (e.g., a specified textual logo 204 or other text) is detected. The first threshold value $T_1$ is set such that higher confidence predictions (e.g., video frames 104 of predictions 106 having a distance D equal to or below the first threshold value) are determined to include the target text 202 and lower confidence predictions (e.g., video frames 104 of predictions 106 having a distance D above the first threshold value) are determined to not include the target text 202.

According to examples, the shot analyzer 114 analyzes the shots of the video 102 and determines whether a shot includes at least one video frame 104 that has a prediction 106 with a distance value D corresponding to a representative prediction. In some examples, a representative prediction is a prediction 106 having a distance value D of zero (0). When a shot is determined to include a video frame 104 with a representative prediction, the shot analyzer 114 extends detected video frames 104 by applying a second threshold value $T_2$ to the predictions 106, where the second threshold value $T_2$ is higher (e.g., less strict) than the first threshold value $T_1$. For each video frame 104 in the shot where the predicted text's distance value D is above the first threshold value $T_1$ (e.g., the prediction 106 is determined to not include the target text 202), the shot analyzer 114 determines whether the predicted text's distance value D satisfies the second threshold value $T_2$ (e.g., the prediction 106 has a distance D below the second threshold value $T_2$ ($D<T_2$)). When the predicted text's distance value D is determined to be below the second threshold value $T_2$, the video frame 104 is determined (e.g., inferred) to include the target text 202 (e.g., a textual logo 204).

According to examples, the shot analyzer 114 further extends the detected video frames 104 to include additional (e.g., unsampled) frames in a time-range (e.g., of a shot) by identifying adjacent video frames 104 with the target text 202 and extending boundaries of the detected frames within the shot. In one example, extension boundaries of a specific frame are calculated as:

$$N = \max \text{ number of frames to extend} = \text{round}(0.25 \times FPS)$$

$$\text{left}_S(frameID) = \max(frameID - N, \text{Start}(S)); \text{ and}$$

$$\text{right}_S(frameID) = \min(frameID + N, \text{End}(S)), \text{ where:}$$

S=a shot of the video;
$\text{left}_s$ (frameID)=the left boundary of the given frame's extension within S;
$\text{right}_s$=the right boundary of the given frame's extension within S;
frameID=frame number;
FPS=a frame rate of the video;
Start(S)=a start of the shot; and
End(S)=an end of the shot.

The video frames 104 included in the interval: [left$_S$, right$_S$] are added to a listing of video frames 104 determined to include the target text 202.

According to examples, this extends detection of the target text 202 to the full appearance of the target text 202 in the shot, without harming the precision of the detection. A combination of using textual-visual scoring and extending the detected frames provides an improvement over single image analysis. For instance, by grouping lower confidence predictions, that may otherwise be determined as not including the target text 202, with accurately predicted text (e.g., of the representative prediction 106) of a shot, the video analyzer 110 is able to generate results that are representative of a viewer experience of a textual logo 204 in a video 102, while maintaining precision. Output 108 of the video analyzer 110 includes a listing of one or more sequences of video frames 104 in which the target text 202 is detected. The output 108, in some examples, includes video frames 104 that include the target text 202 based on determinations made by the distance calculator 112 using the first threshold value $T_1$ and additional video frames 104 that are inferred to include the target text 202 based on determinations made by the shot analyzer 114 using the second threshold value $T_2$ and boundaries of the shot. For instance, if in a first video frame 104 of a video 102 being viewed by a viewer, target text 202 is visible, and in a second video frame 104 the target text 202 is partially or almost invisible because of movement, blurriness, an obstruction, etc., the viewer still associates the target text 202 in the second frame with a particular item or feature (e.g., a textual logo 204 being associated with a particular product). Aspects of the video analyzer 110 generate results that represent this viewer experience by outputting video frames 104 in which the target text 202 is detected and video frames 104 in the same shot in which the target text 202 is detected by inference.

Figure 4:
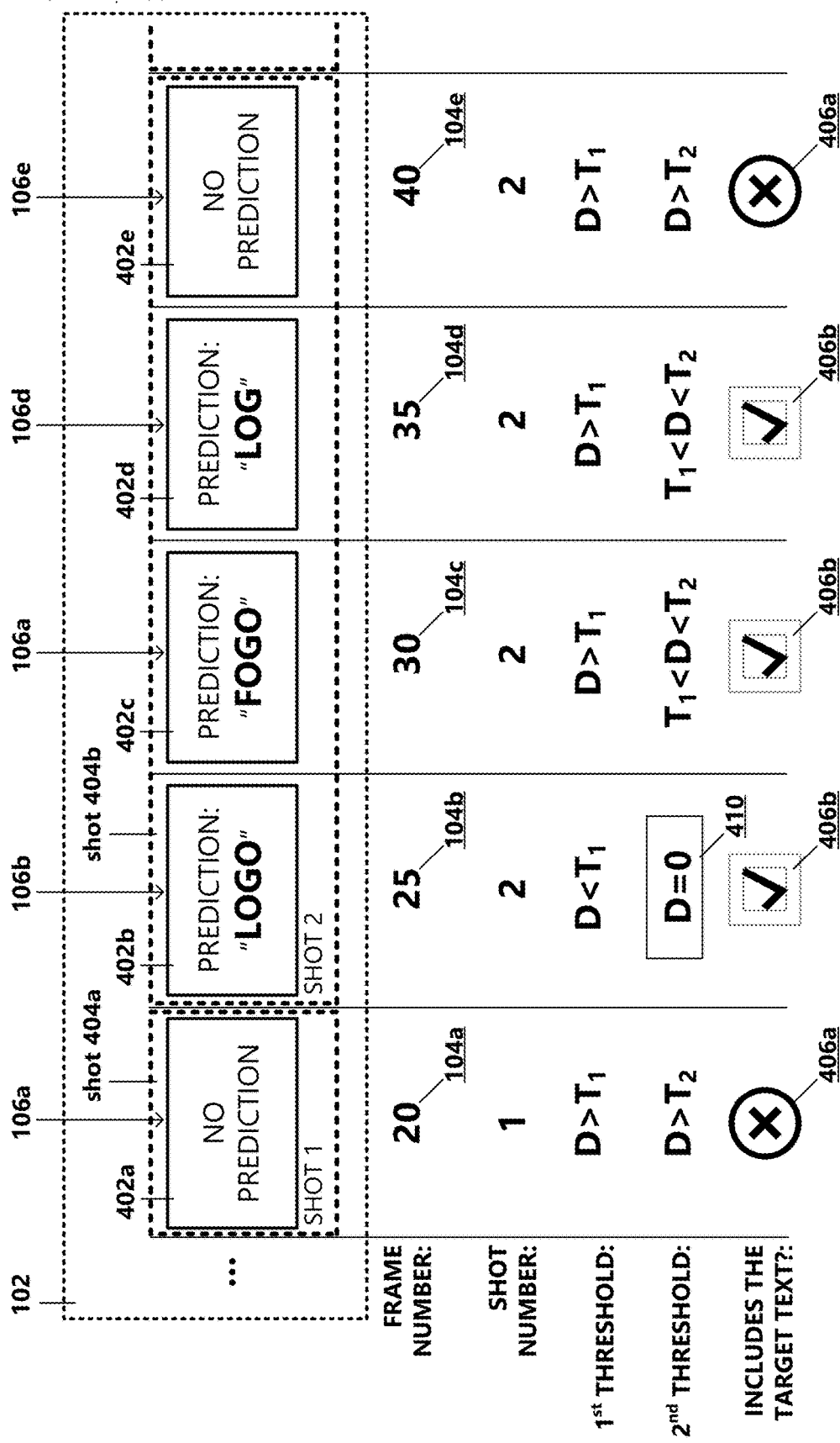
FIG. 4 is an illustration depicting an analysis of frames of a video for detecting text according to an example.

As an example, and with reference to FIG. 4, a plurality of video frames 104a-104e of an example video 102 with 20 frames per second (FPS) are sampled by the OCR engine 150 at a sampling rate of 4 FPS. A plurality of $D_{min}$ predictions 106a-106e corresponding to the sampled video frames 104a-104e are evaluated by the video analyzer 110 for the target text 202: "LOGO". For example, the first threshold value $T_1$ is applied to the $D_{min}$ predictions 106a-106e of the video frames 104a-104e. For instance, a first video frame 104a (e.g., frame number 20) is included in a first shot 404a and includes no predicted text 402a. As such, the distance D to the target text 202 is determined to be above the first threshold value $T_1$. Further, second, third, fourth, and fifth video frames 104b-104e (e.g., frame numbers 25, 30, 35, and 40) are included in a second shot 404b. The second video frame 104b (e.g., frame number 25) includes the predicted text 402b "LOGO", which is a match to the target text 202. As such, the distance D to the target text 202 is determined to be below the first threshold value $T_1$. The third video frame 104c (e.g., frame number 30) includes the predicted text 402c "FOGO", which is determined to have a distance D above the first threshold value $T_1$. The fourth video frame 104d (e.g., frame number 35) includes the predicted text 402d "LOG", which is also determined to have a distance D above the first threshold value $T_1$. Additionally, the fifth video frame 104e (e.g., frame number 40) includes no predicted text 402e and is determined to have a distance D above the first threshold value $T_1$. Accordingly, after the first threshold value $T_1$ is applied, the second video frame 104b (e.g., frame number 25) may be the only frame of frames 20-40 in which the target text 202 is detected.

According to examples, a determination is made as to whether any video frames 104 in the shots 404a,404b include a representative prediction 410, where a representative prediction 410 in the depicted example is a prediction 106 having a distance D equal to 0. For example, the second shot 404b is determined to include the representative prediction 410 in the second video frame 104b. Thus, the second threshold value $T_2$ is applied to the $D_{min}$ predictions 106b-106e included in the second shot 404b. According to an aspect, the second threshold value $T_2$ is higher (e.g., less strict) than the first threshold value $T_1$. For each video frame 104b-104e in the second shot 404b, a determination is made as to whether the prediction's distance value D is between the first threshold value $T_1$ and the second threshold value $T_2$ (e.g., $T_1$<D<$T_2$). As shown in FIG. 4, the distance value D is determined to be between the first threshold value $T_1$ and the second threshold value $T_2$ in the third video frame 104c and the fourth video frame 104d. Based on the FPS of the video 102 and extending boundaries of video frames 104b-104d within the shot, an inference is made of a frame sequence that includes the target text 202. As an example, with the FPS of the video 102 is 40 FPS, the third video frame 104c (frame 35) and the fourth video frame 104d (frame 40) are in a same shot, where a match is found in the third video frame 104c (frame 35). Using the frame extension method described above to determine the right extension boundary (e.g., min(0.25×FPS,End(S)−35)=min(0.25× 40,40−35)=min(10,5)=5), a determination is made to extend the detected frames to the right by 5 frames (e.g., to the fourth video frame 104d (frame 40). Additionally, using the frame extension method described above to determine the left extension boundary (e.g., min(0.25×40,35−Start(S)) =min(10,35−21)=9), a determination is made to extend the detected video frames to the left by 9 frames (e.g., to video frame 21). Results of the video analyzer 110 are provided as output and include a sequence of frames (e.g., video frames [21,40]) that are determined to include the target text 202 (e.g., "logo"). Example output 108 of the video analyzer 110 is depicted in FIG. 5.

Figure 5:
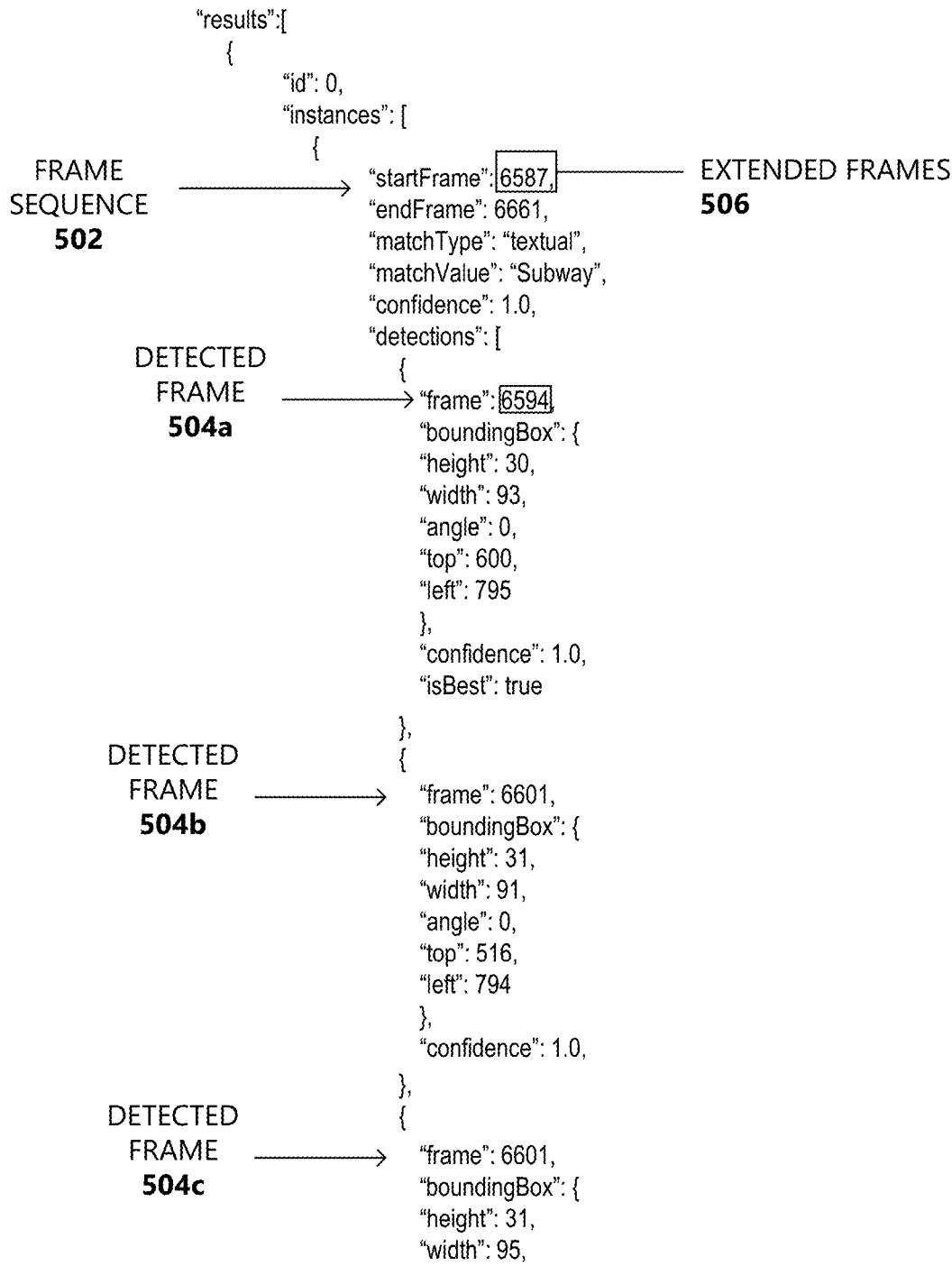
FIG. 5 is an illustration of example output provided by the system according to an example.

With reference now to FIG. 5, the example output 108 includes a frame sequence 502 determined by the text detector 125 to include the target text 202 "Subway". The frame sequence 502 has a starting frame (e.g., frame number 6587) and an ending frame (e.g., frame number 6661). In some examples, the output 108 includes the predicted text 402 that the OCR engine 150 has recognized text in the frame sequence 502 to be, a confidence score of the frame sequence 502, and a listing of detected frames 504a-504c (collectively, detected frames 504) in the frame sequence 502. For instance, detected frames 504 are frames where the target text 202 (e.g., a specified textual logo 204 or other text) is detected based on application of the first threshold value $T_1$ to the textual-visual distance value D of the predictions 106. In some examples, the frame sequence 502 further includes one or more extended frames 506. For instance, extended frames 506 are frames where the target text 202 is detected based on application of the second threshold value $T_2$ to the textual-visual distance value D of the sampled predictions 106 and/or based on extending boundaries of the detected frames 504 to the beginning and to the end of the shot 404. For instance, the starting frame of the frame sequence 502 in the depicted example is frame number 6587, where the first detected frame 504a is frame number 6594. Therefore, frame numbers 6587-6593 are extended frames 506. In some examples, information associated with the detected frames 504 is included in the output 108, such as the frame numbers, the bounding box information, and the confidence score.

The present disclosure provides a plurality of technical features including an ability to infer and classify unsampled video frames 104, which enables use of a computationally efficient OCR engine 150, rather than training and running a more computationally expensive OCR engine 150 to detect a particular target text. Moreover, each shot is an independent unit that can be analyzed in parallel to increase processing speed.

In some examples, functionality of the text detector 125 is extended to include one or more verification processes. The verifier 116 verifies, and in some examples, corrects, OCR predictions 106. In one example implementation, the verifier 116 applies a weight to predictions 106 by language frequency. For instance, the distance calculator 112 and shot analyzer 114 make determinations based on a visual distance metric D. The verifier 116 determines whether the predicted text 402 is indeed the target text 202 or different text not related to the target text 202 based on language frequency. For instance, when the text detector 125 is used to detect a textual logo 204 in a video 102, the text of the textual logo is likely a name of an enterprise or brand and is likely to be a word that does not have high frequency usage in a given language. Thus, when a word has high frequency usage in a language and it appears as predicted text 402, the verifier 116 penalizes the textual distance metric D of the prediction 106 to reduce its probability of being determined as the target text 202. As an example, the text detector 125 may be instructed to look for the target text 202 "LOOF", and the OCR engine 150 predicts "LOOK". In an example, the characters "F" and "K" are similar, so the distance D between the characters and between the words is small. Because "LOOK" is a valid word with high frequency in the English language, the prediction is penalized.

In another implementation, the verifier 116 uses the bounding boxes output by the OCR engine 150 to crop the predicted text 402 from a video frame 104 and verify the results using another model, such as a zero shot detection model, a Siamese network architecture model, a scale-invariant feature transform (SIFT) model, or another type of image comparison model.

Additional details associated with the processing of predictions 106 by the video analyzer 110 are described below. In an example, the video analyzer 110 additionally provides access to the system 100 via appropriate user interface devices (e.g., displays) and via application program interfaces (APIs). Although FIG. 1 shows the example system 100 as having a certain number of components arranged in a certain manner, in other examples, the system 100 may include additional or fewer components, arranged differently. As an example, the functionality associated with the video analyzer 110 and the OCR engine 150 may be combined or distributed across separate components or devices depending on the application scenario.

Figure 6:
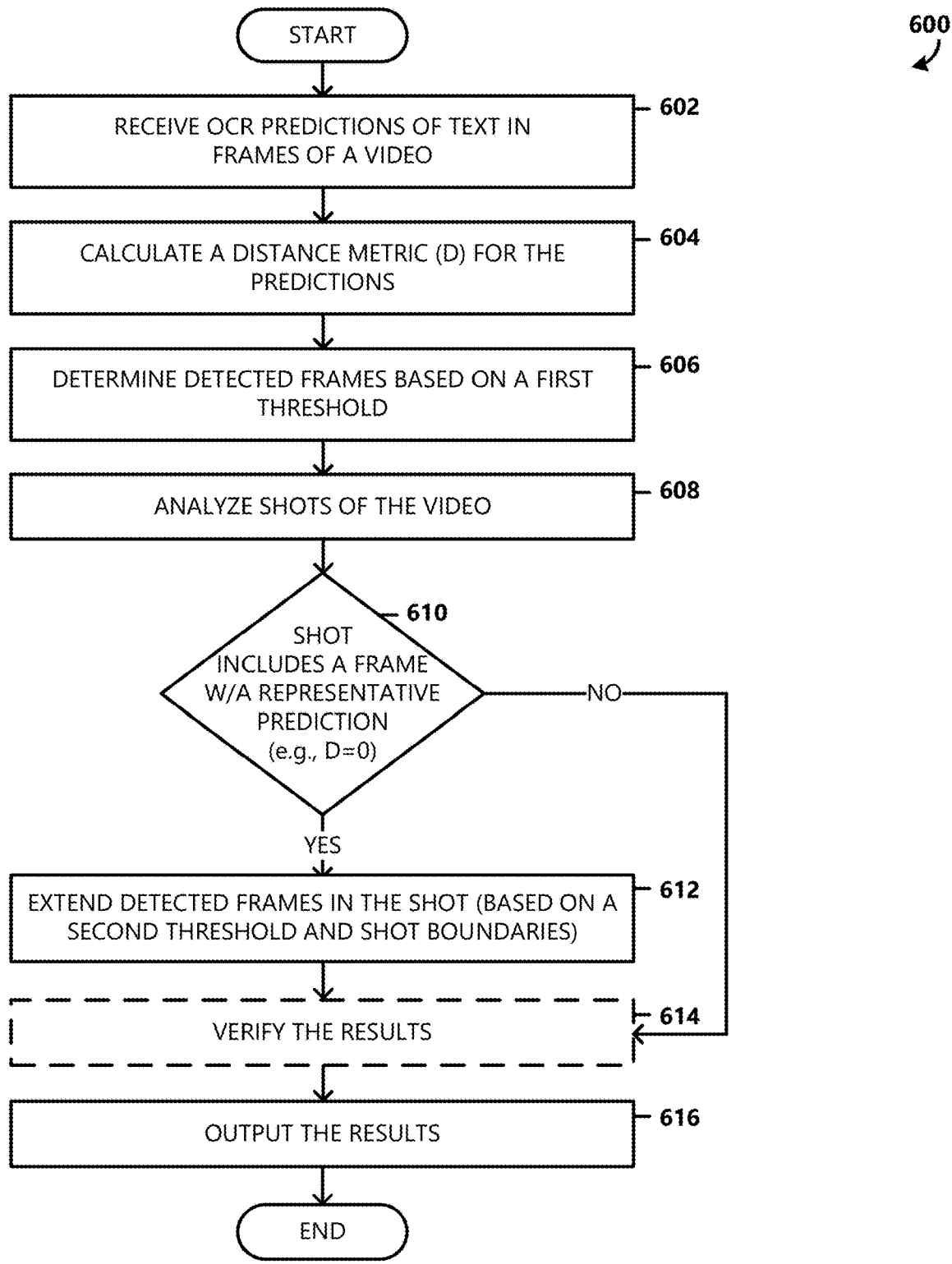
FIG. 6 is a flowchart depicting operations of an example method for detecting text in a video.

With reference now to FIG. 6, a flowchart depicting a method 600 for providing text detection in a video 102 according to an example is provided. The operations of method 600 may be performed by one or more computing devices, such as the video analyzer 110 depicted in FIG. 1. At operation 602, predictions 106 of text 202 recognized by the OCR engine 150 in a video 102 are received. For example, video frames 104 in the video 102 are extracted based on a frame sampling rate (e.g., one frame per second, 2 frames per second, 4 frames per second). The OCR engine 150 may analyze and detect text (e.g., characters and words) in the video frames 104 and provide predictions 106 of the text to the video analyzer 110.

At operation 604, a scoring system is used to determine distance metrics (D) (e.g., a textual-visual score) between specified target text 202 and predicted text 402 of the sampled video frames 104. According to some example implementations, the video analyzer 110 is instructed to look for target text 202 having specific properties (e.g., font type, bold, italics). In some examples, the target text 202 corresponds to text included in a textual logo 204. According to examples, the video analyzer 110 visually compares characters (e.g., letters, numbers, symbols) in the target text 202 and predicted text 402 to determine an optimal transport cost to move from one character to another.

At operation 606, a first filtering operation is performed, where the predictions 106 are filtered based on a first confidence score threshold $T_1$. The first confidence score threshold $T_1$ is set such that higher confidence predictions (e.g., video frames 104 of predictions 106 having a distance D equal to or below the first threshold value) are determined as a detected frame 504 (i.e., a video frame 104 including the target text 202) and lower confidence predictions (e.g., video frames 104 of predictions 106 having a distance D above the first threshold value) are determined to not include the target text 202.

At operation 608, shots 404 of the video 102 are analyzed and a determination is made at decision operation 610 as to whether a shot 404 includes at least one video frame 104 with a distance value D equal to zero (0) or to another value corresponding to a representative prediction 410.

When a shot 404 is determined to include a video frame 104 with a representative prediction 410, the method 600 proceeds to operation 612, where the video analyzer 110 includes extended frames 506 in the detection results. For example, the video analyzer 110 applies a second threshold value $T_2$ to the sampled video frames 104, where the second threshold value $T_2$ is higher (e.g., less strict) than the first threshold value $T_1$. Additionally, for each video frame 104 in the shot 404 determined to not include the target text 202 (e.g., $D<T_1$), a determination is made as to whether the predicted text's distance value D is below the second threshold value $T_2$ (e.g., $D<T_2$). When the predicted text's distance value D is determined to be below the second threshold value $T_2$, the video frame 104 is determined (e.g., inferred) to include the target text 202 (e.g., a textual logo 204), and the detection results are expanded to include the video frame 104. Additionally, boundaries of the detection results are extended to a determined right extension boundary and a determined left extension boundary within the shot 404 to infer and classify unsampled frames of the shot 404. The video frames 104 included in the interval: [$left_S$, $right_S$] are added to the detection results determined to include the target text 202.

At optional operation 614, the detection results are verified. In one example, the detected frames 504 and extended frames 506 are weighted based on language frequency, where the textual distance metric D of a prediction 106 is penalized when it includes a frequently used word of a language to reduce its probability of being determined as the target text 202. In another example, bounding boxes are used to crop the predicted text 402 from a video frame 104 and verify the results using another model, such as a zero shot detection model, a Siamese network architecture model, a scale-invariant feature transform (SIFT) model, or another type of image comparison model.

At operation 616, the detection results are output to a requestor. For instance, the output 108 includes a frame sequence 502 including detected frames 504 where the target text 202 (e.g., a specified textual logo 204 or other text) is detected based on application of the first threshold value $T_1$ and, in some examples, one or more extended frames 506 where target text 202 is inferred based on application of the second threshold value $T_2$ and extending boundaries of the frames to the beginning and to the end of the shot.

Figure 7:
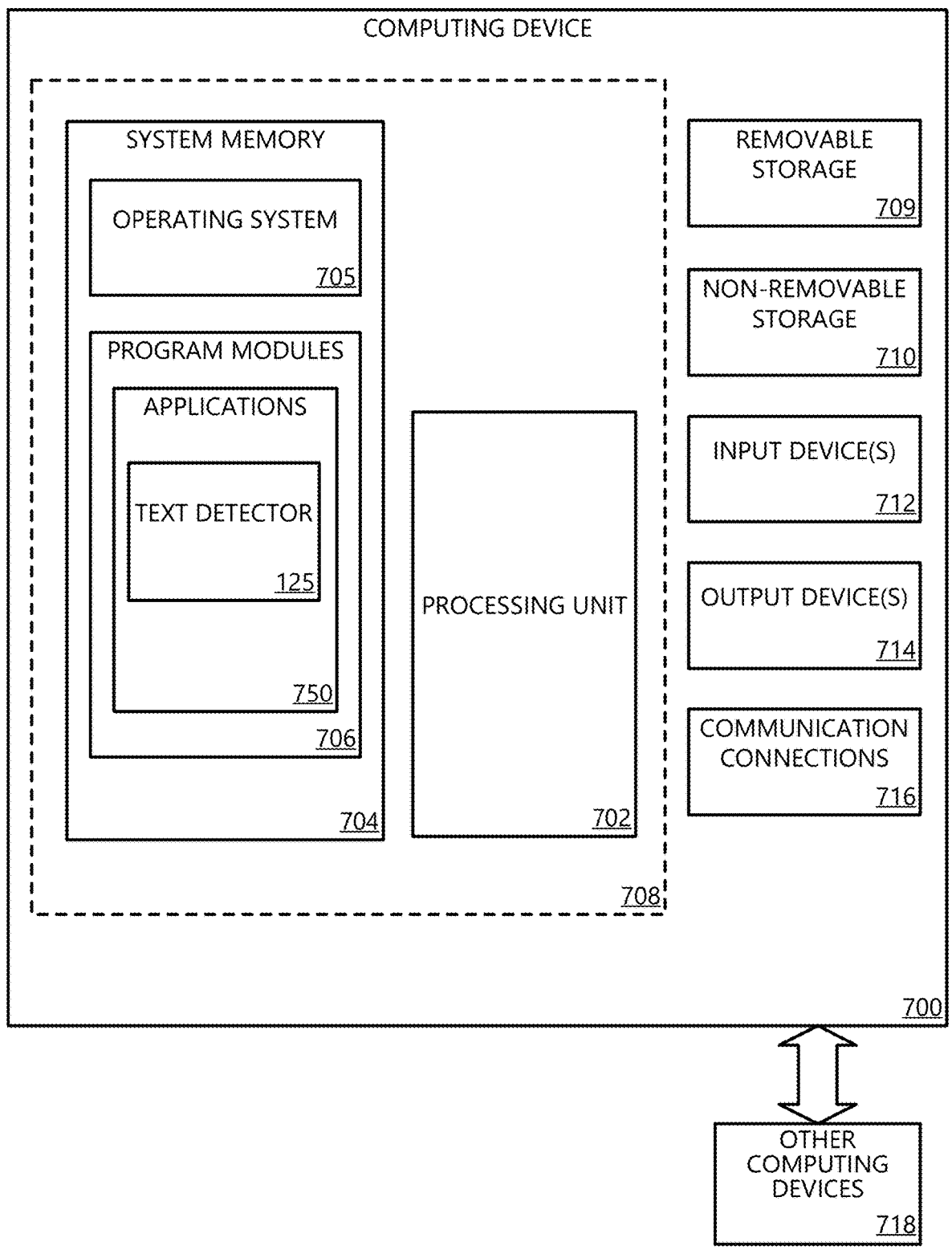
FIG. 7 is a block diagram illustrating example physical components of a computing device with which aspects of the disclosure may be practiced.
Figure 8A:
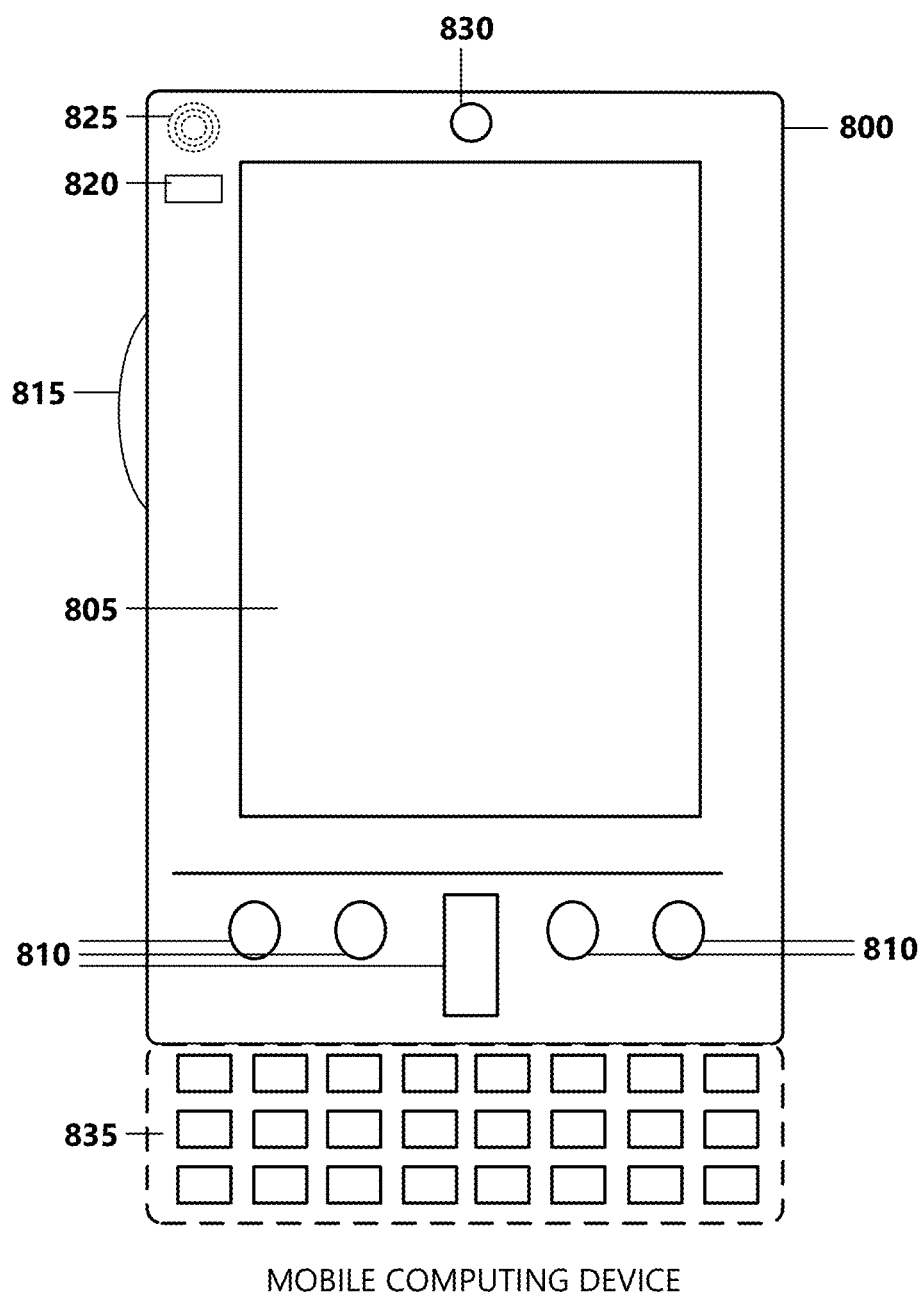
FIGS. 8A and 8B are block diagrams of an example mobile computing device with which aspects of the present disclosure may be practiced.
Figure 8B:
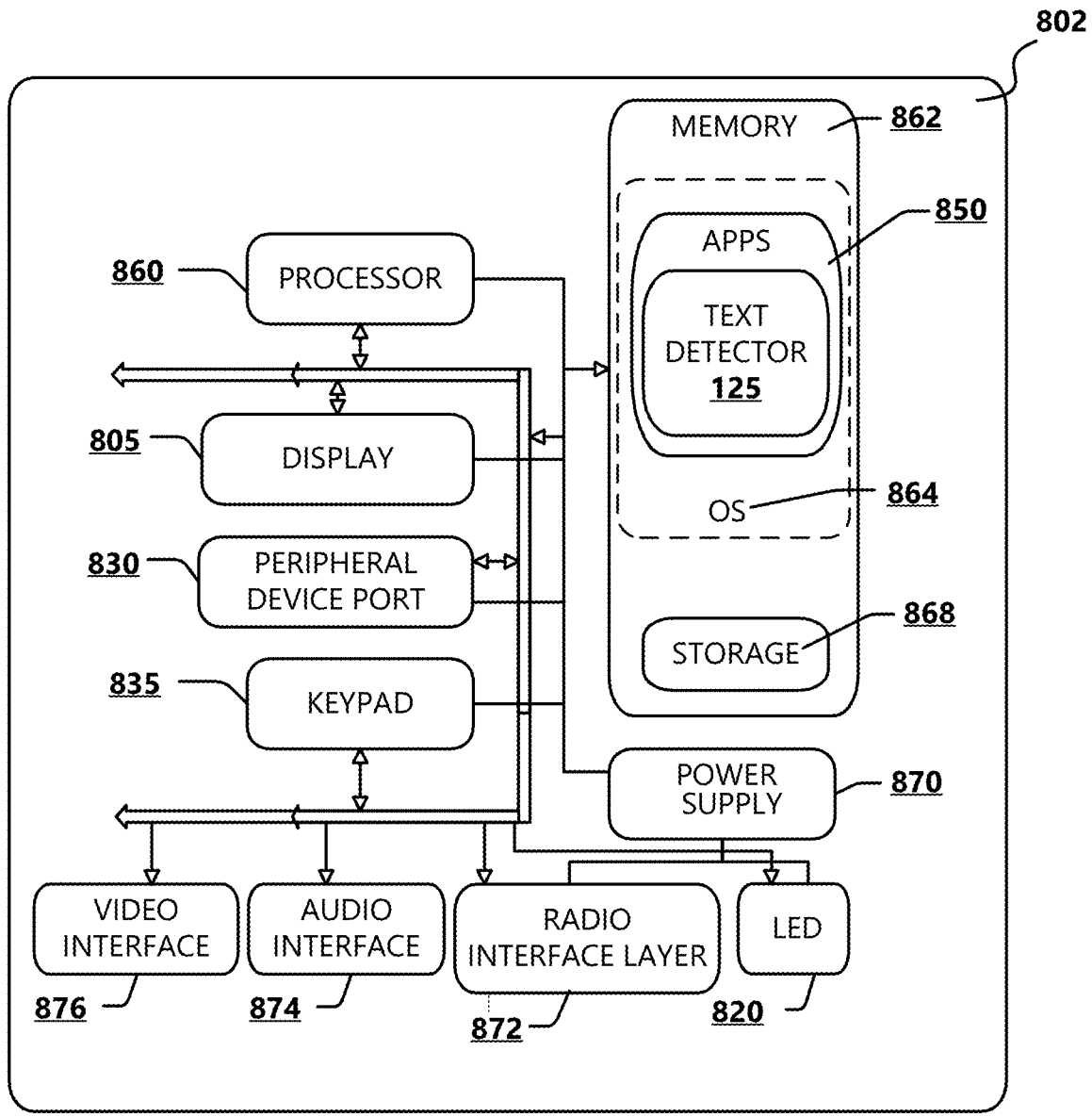

FIGS. 7, 8A, and 8B and the associated descriptions provide a discussion of a variety of operating environments in which examples of the disclosure may be practiced. However, the devices and systems illustrated and discussed with respect to FIGS. 7, 8A, and 8B are for purposes of example and illustration, a vast number of computing device configurations that may be utilized for practicing aspects of the disclosure, described herein.

FIG. 7 is a block diagram illustrating physical components (e.g., hardware) of a computing device 700 with which examples of the present disclosure may be practiced. The computing device components described below may be suitable for one or more of the components of the system 100 described above. In a basic configuration, the computing device 700 includes at least one processing unit 702 and a system memory 704. Depending on the configuration and type of computing device 700, the system memory 704 may comprise volatile storage (e.g., random access memory), non-volatile storage (e.g., read-only memory), flash memory, or any combination of such memories. The system memory 704 may include an operating system 705 and one or more program modules 706 suitable for running software applications 750, such as the text detector 125 and other applications.

The operating system 705 may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 may perform processes including one or more of the stages of the method 600 illustrated in FIG. 6. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing text detection in a video 102 may be operated via application-specific logic integrated with other components of the computing device 700 on the single integrated circuit (chip). Examples of the present disclosure may also be practiced using other technologies capable of performing logical operations such as, for example, AND, OR, and NOT, including mechanical, optical, fluidic, and quantum technologies.

The computing device 700 may also have one or more input device(s) 712 such as a keyboard, a mouse, a pen, a sound input device, a touch input device, a camera, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 704, the removable storage device 709, and the non-removable storage device 710 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer readable media may be part of the computing device 700. Computer readable media does not include a carrier wave or other propagated data signal.

Communication media may be represented by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

FIGS. 8A and 8B illustrate a mobile computing device 800, for example, a mobile telephone, a smart phone, a tablet personal computer, a laptop computer, and the like, with which aspects of the disclosure may be practiced. With reference to FIG. 8A, an example of a mobile computing device 800 for implementing at least some aspects of the present technology is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative examples, mobile computing device 800 may incorporate more or less input elements. For example, the display 805 may not be a touch screen in some examples. In alternative examples, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some examples, the mobile computing device 800 incorporates a vibration transducer for providing the user with tactile feedback. In yet another example, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 can incorporate a system (e.g., an architecture) 802 to implement some examples. In one example, the system 802 is implemented as a "smart phone" capable of running one or more applications (e.g., videoconference or virtual meeting application, browser, e-mail, calendaring, contact managers, messaging clients, games, and media clients/players). In some examples, the system 802 is integrated as a computing device, such as an integrated personal digital assistant (PDA) and wireless phone.

One or more application programs 850 (e.g., one or more of the components of system 100) may be loaded into the memory 862 and run on or in association with the operating system 864, such as the text detector 125. Other examples of the application programs 850 include videoconference or virtual meeting programs, phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 850 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at a remote device or server. As should be appreciated, other applications may be loaded into the memory 862 and run on the mobile computing device 800.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency (RF) communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 850 via the operating system 864, and vice versa.

The visual indicator 820 (e.g., light emitting diode (LED)) may be used to provide visual notifications and/or an audio interface 874 may be used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. The system 802 may further include a video interface 876 that enables an operation of a peripheral device port 830 (e.g., an on-board camera) to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

Figure 9:
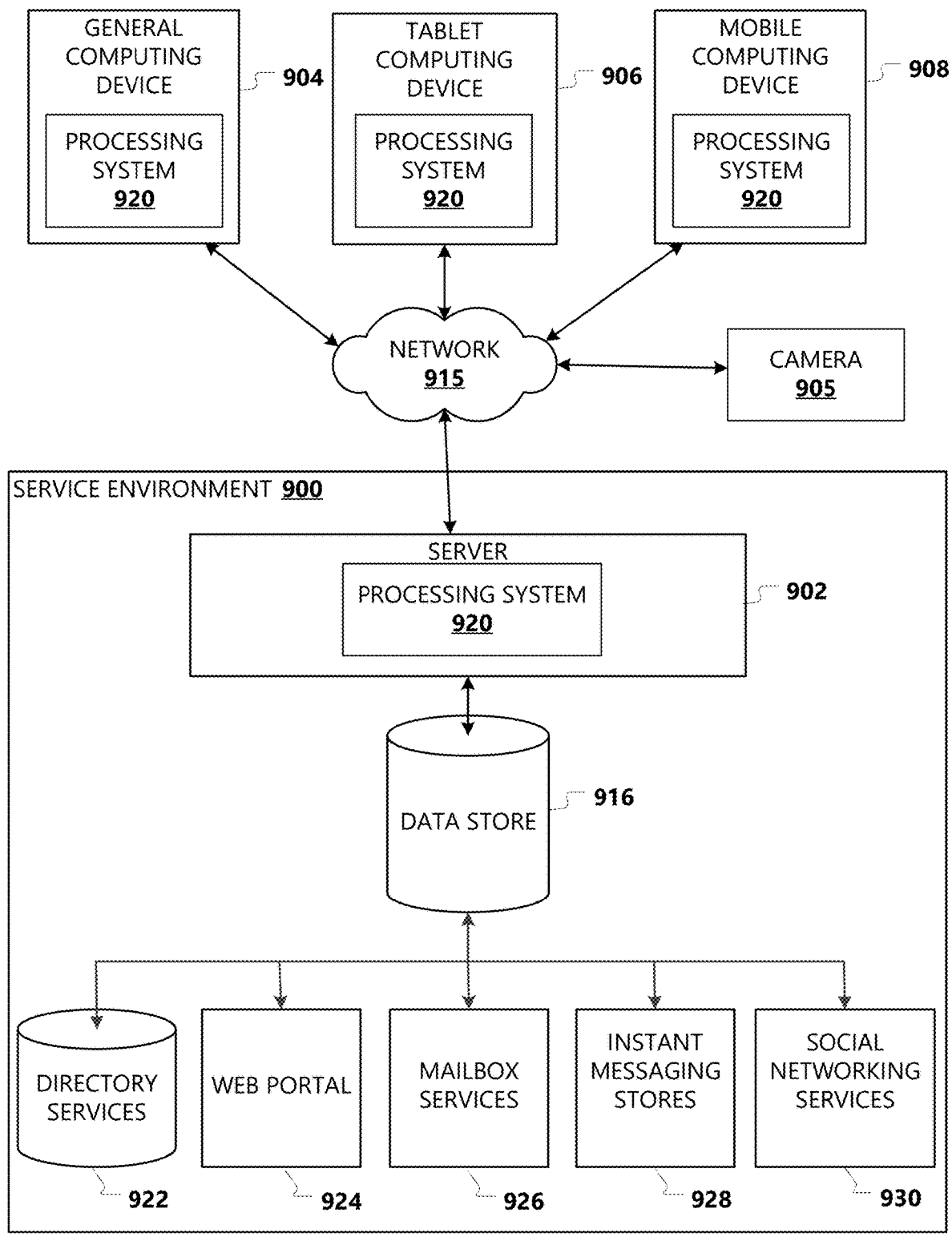
FIG. 9 is a simplified block diagram of an example distributed computing system for practicing aspects of the present disclosure.

FIG. 9 illustrates one aspect of the architecture of a system for processing data received at a service environment 900 from a remote source, such as a personal computer 904, tablet computing device 906, a mobile computing device 908, or a camera 905. Content received and/or displayed at server device 902 may be stored in different communication channels or other storage types. For example, various documents and files may be stored using directory services 922, web portals 924, mailbox services 926, instant messaging stores 928, or social networking services 930.

One or multiple processing systems 920 may be implemented by server device 902 and/or a remote source that communicates with server device 902. For instance, in one example, a processing system 920 is implemented locally on a server device 902. In another example, multiple processing systems 920 (or the functionality thereof) are distributed among multiple computing devices, including server device 902 and one or more remote sources. The server device 902 provides data to and from remote sources through a network 915. As one example, server device 902 receives a video file (e.g., stored video) from a personal computer and transmits a sequence of frames that include target text to the personal computer. As another example, server device 902 receives broadcasted video (e.g., streamed video) from a camera device and transmits a sequence of frames that include target text to a mobile computing device.

Examples include a computer-implemented method, comprising: receiving predicted text derived from processing frames in a video via optical character recognition (OCR); determining a visual distance of the predicted text to target text; determining, within a shot, a set of detected frames that include the target text by applying a first distance threshold to the visual distance of the predicted text; extending the set of detected frames within the shot by applying a second distance threshold to the visual distance of the predicted text within the shot; determining a sequence of frames in the shot that includes the extended set of detected frames; and outputting the sequence of frames as results including the target text.

Examples include a system for recognition of text in a video, the system comprising: a processor; and memory storing instructions that, when executed by the processor, cause the system to: receive predicted text derived from processing frames in a video via optical character recognition (OCR); determine a visual distance of the predicted text to target text; determine, within a shot, a set of detected frames that include the target text by applying a first distance threshold to the visual distance of the predicted text; extend the set of detected frames within a shot by applying a second distance threshold to the visual distance of the predicted text within the shot; determine a sequence of frames in the shot that includes the extended set of detected frames; and output the sequence of frames as results including the target text.

Examples include a computer readable medium comprising instructions, which when executed by a computer, cause the computer to: receive a plurality of predicted texts derived from processing frames in a video via optical character recognition (OCR); determine a visual distance of each predicted text of the plurality of predicted texts to target text; determine a set of detected frames that include the target text by applying a first distance threshold to the visual distance of each predicted text; extend the set of detected frames within a shot by applying a second distance threshold to the visual distance of each predicted text within the shot, wherein the second distance threshold is less strict than the first distance threshold; determine a sequence of frames in the shot that includes the extended set of detected frames; and output the sequence of frames as results including the target text.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A computer-implemented method, comprising:
    receiving predicted text derived from processing frames in a video via optical character recognition (OCR);
    determining a visual distance of the predicted text to target text;
    determining, within a shot, a set of detected frames that include the target text by applying a first distance threshold to the visual distance of the predicted text;
    extending the set of detected frames within the shot by applying a second distance threshold to the visual distance of the predicted text within the shot;
    determining a sequence of frames in the shot that includes the extended set of detected frames; and
    outputting the sequence of frames as results including the target text.

2. The method of claim 1, wherein extending the set of detected frames further comprises determining a frame in the set of detected frames that has a visual distance corresponding to a representative prediction, wherein the frame is included in the shot.

3. The method of claim 1, wherein extending the set of detected frames further comprises:
    determining boundaries of the detected frames; and
    extending the boundaries to a beginning of the shot from an earliest detected frame and from a latest detected frame to an end of the shot.

4. The method of claim 1, wherein the first distance threshold is stricter than the second distance threshold.

5. The method of claim 1, wherein determining the visual distance comprises using optimal transport to visually compare characters in the predicted text to the target text.

6. The method of claim 1, further comprising verifying the sequence of frames prior to outputting the sequence of frames.

7. The method of claim 6, wherein verifying the sequence of frames comprises:
    determining the predicted text is a frequently occurring word, wherein the target text is a textual logo; and
    applying a weight to the visual distance to penalize the predicted text.

8. A system, comprising:
    a processing system; and
    memory storing instructions that, when executed by the processing system, cause the system to:
        receive predicted text derived from processing frames in a video via optical character recognition (OCR);
        determine a visual distance of the predicted text to target text;
        determine, within a shot, a set of detected frames that include the target text by applying a first distance threshold to the visual distance of the predicted text;
        extend the set of detected frames within a shot by applying a second distance threshold to the visual distance of the predicted text within the shot;
        determine a sequence of frames in the shot that includes the extended set of detected frames; and
        output the sequence of frames as results including the target text.

9. The system of claim 8, wherein extending the set of detected frames comprises determining a frame in the set of detected frames has a visual distance corresponding to a representative prediction, wherein the frame is included in the shot.

10. The system of claim 8, wherein extending the set of detected frames comprises:
    determining boundaries of the detected frames; and
    extending the boundaries to a beginning of the shot from a earliest detected frame and from a latest detected frame to an end of the shot.

11. The system of claim 8, wherein the first distance threshold is stricter than the second distance threshold.

12. The system of claim 8, wherein determining the visual distance comprises using optimal transport to visually compare characters in the predicted text to the target text.

13. The system of claim 8, wherein the instructions cause the system to verify the sequence of frames prior to outputting the sequence of frames.

14. The system of claim 13, wherein:
    the target text is a textual logo; and
    verifying the sequence of frames comprises:
        determining the predicted text is a frequently occurring word; and
        applying a weight to the visual distance to penalize the predicted text.

15. A computer readable media comprising instructions, which when executed by a computer, cause the computer to:
    receive a plurality of predicted texts derived from processing frames in a video via optical character recognition (OCR);
    determine a visual distance of each predicted text of the plurality of predicted texts to target text;
    determine a set of detected frames that include the target text by applying a first distance threshold to the visual distance of each predicted text;
    extend the set of detected frames within a shot by applying a second distance threshold to the visual distance of each predicted text within the shot, wherein the second distance threshold is less strict than the first distance threshold;
    determine a sequence of frames in the shot that includes the extended set of detected frames; and
    output the sequence of frames as results including the target text.

16. The computer readable media of claim 15, wherein extending the set of detected frames comprises determining at least one frame in the set of detected frames has a visual distance corresponding to a representative prediction, wherein the at least one frame is included in the shot.

17. The computer readable media of claim 15, wherein in extending the set of detected frames, the instructions further cause the computer to:
    determine boundaries of the detected frames; and
    extend the boundaries to a beginning of the shot from a earliest detected frame and from a latest detected frame to an end of the shot.

18. The computer readable media of claim 15, wherein in determining the visual distance, the instructions cause the computer to use optimal transport to visually compare characters in the plurality of predicted texts to the target text.

19. The computer readable media of claim 15, wherein the instructions cause the computer to verify the sequence of frames prior to outputting the sequence of frames.

20. The computer readable media of claim 15, wherein:
    the target text is a textual logo; and
    verifying the sequence of frames comprises, for each predicted text in the sequence of frames:
        determining the predicted text is a frequently occurring word; and applying a weight to the visual distance to penalize the predicted text.

* * * * *